United States Patent
Lin et al.

(10) Patent No.: US 7,386,190 B2
(45) Date of Patent: Jun. 10, 2008

(54) METHOD FOR IMAGE CROPPING

(75) Inventors: Tsung-Wei Lin, Taipei (TW); James Wu, Taoyuan (TW)

(73) Assignee: Corel TW Corp., Taipei (TW)

( * ) Notice: Subject to any disclaimer, the term of this patent is extended or adjusted under 35 U.S.C. 154(b) by 711 days.

(21) Appl. No.: 10/835,011

(22) Filed: Apr. 30, 2004

(65) Prior Publication Data

US 2005/0244079 A1   Nov. 3, 2005

(51) Int. Cl.
*G06K 9/32* (2006.01)
*G06K 9/20* (2006.01)

(52) U.S. Cl. .............. 382/294; 382/294; 382/282; 382/283

(58) Field of Classification Search ............... 382/282, 382/283, 286, 290, 118, 254, 226, 296; 715/517
See application file for complete search history.

(56) References Cited

U.S. PATENT DOCUMENTS

| 5,781,665 A * | 7/1998 | Cullen et al. ............... 382/254 |
| 6,035,067 A * | 3/2000 | Ponticos ..................... 382/226 |
| 6,907,136 B1 * | 6/2005 | Shigemori ................... 382/118 |
| 7,010,745 B1 * | 3/2006 | Shimada et al. ............ 715/517 |
| 2003/0152291 A1 * | 8/2003 | Cheatle ...................... 382/296 |

* cited by examiner

*Primary Examiner*—Jingge Wu
*Assistant Examiner*—Jayesh A Patel
(74) *Attorney, Agent, or Firm*—Birch, Stewart, Kolasch & Birch, LLP

(57) ABSTRACT

A method to crop image from an irregularly shaped region. A top-left corner of the best cropping rectangle are determined by sequentially scanning the rows of the irregularly shaped region to find out the largest bounding area. By rolling back the largest bonding area from the x or y direction, the bottom-right corner is determined.

6 Claims, 5 Drawing Sheets

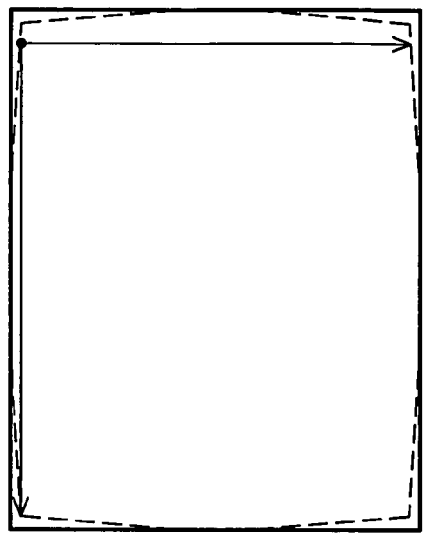
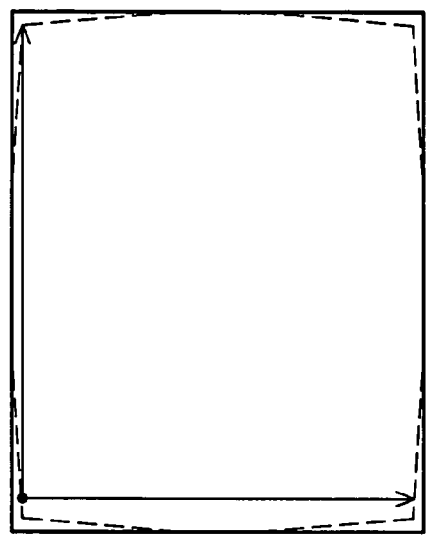
FIG. 5A  FIG. 5B
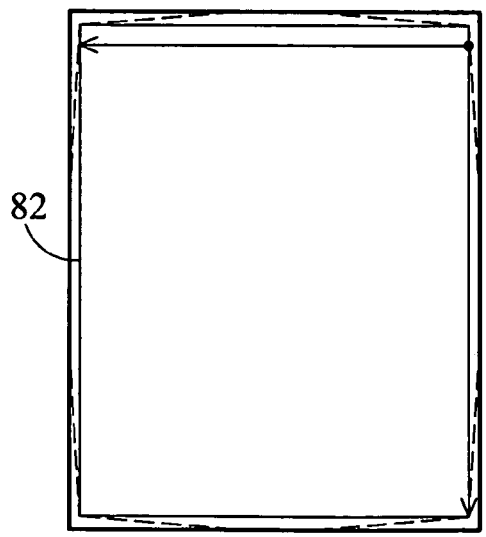
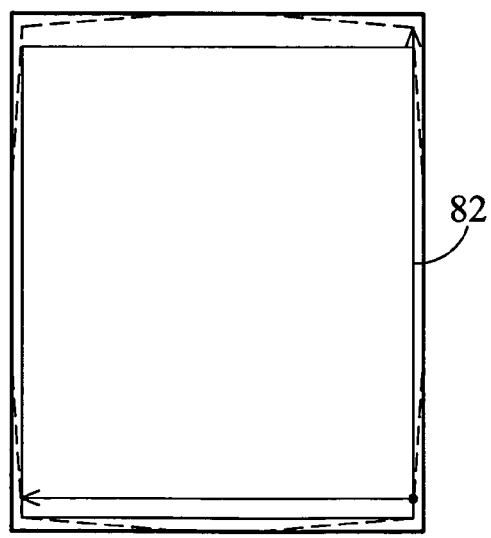
FIG. 5C  FIG. 5D $$\begin{bmatrix} 0 & 500 \\ 0 & 499 \\ 1 & 499 \\ 2 & 498 \\ \vdots & \\ \vdots & \\ \vdots & \\ 1 & 499 \\ 0 & 500 \end{bmatrix}$$

FIG. 6

METHOD FOR IMAGE CROPPING

BACKGROUND OF THE INVENTION

1. Field of the Invention

The present invention relates to image cropping and particularly to a method of image cropping for exposure blending, panorama stitching or other multi-shot applications.

2. Description of the Related Art

When photographs are taken without due care by a photographer, the camera may not be correctly orientated with respect to the horizontal. This results in differently tilted images in a multi-shot application, such as exposure blending or panorama stitching. Thus, when these images are registered, each of them should be rotated to be aligned with each other. The alignment result must typically be cropped to generate a final image rectangle with a largest possible overlapping area. A problem then arises of how best to select the position of these cropped images.

SUMMARY OF THE INVENTION

The object of the present invention is to provide a method for image cropping which yields a best cropping rectangle.

The present invention provides a method for image cropping including the steps of A method for image cropping comprising the steps of providing an irregularly shaped region composed of columns and rows of pixels, calculating, within the irregularly shaped region for each of the rows, a first width between a left and right boundary pixel of the row, a height between the left and a boundary pixel of the same column, another height between the left and the other boundary pixel of the same column, and first products of the widths and the heights, and identifying one of the left boundary pixels in the irregularly shaped region as a first corner of the cropping rectangle, wherein the first product calculated for the row of the first corner is the largest, and a semi-finished rectangle region is formed by the first corner, and the length and width which yield the largest first product, calculating, within an overlapping region of the semi-finished rectangle region and the irregularly shaped region, for each of the rows, a width between a right and left boundary pixel of the row, a height between the right and a boundary pixel of the same column, another height between the right and the other boundary pixel of the same column, and second products of the widths and the heights, and identifying one of the right boundary pixels in the overlapping region as a second corner of the cropping rectangle, wherein the second product calculated for the row of the second corner is the largest.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, given by way of illustration only and thus not intended to be limitative of the present invention.

FIG. 5A~5D show four scanning sequences of the autocropping function according to one embodiment of the invention.

FIG. 6 shows the edge list used in the method of FIG. 1.

DETAILED DESCRIPTION OF THE INVENTION

Figure 1:
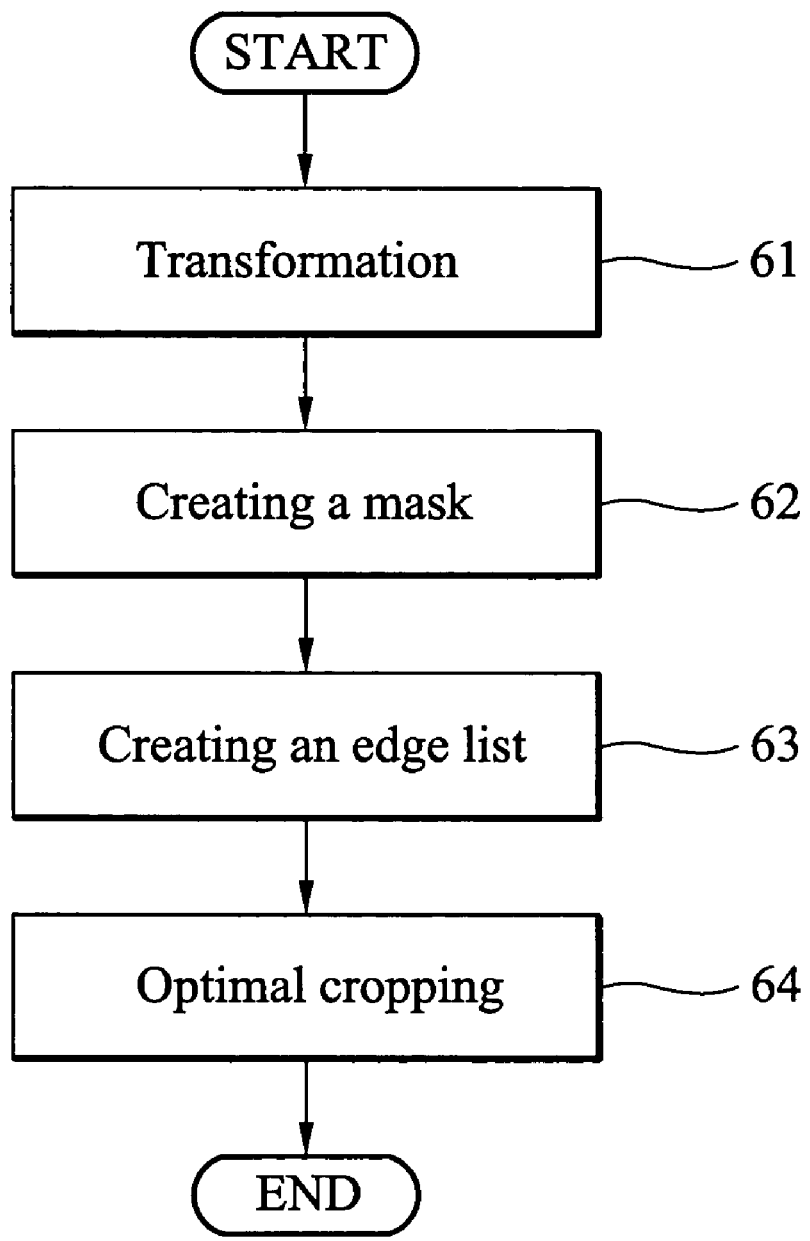
FIG. 1 shows a flowchart of a method for image cropping according to one embodiment of the invention.
Figure 2A:
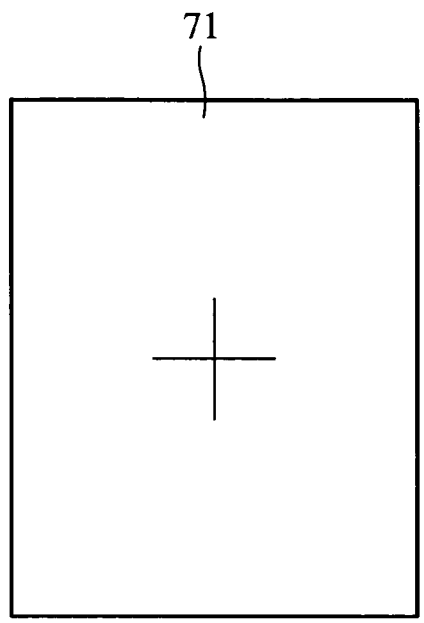
FIG. 2A~2D respectively show four images captured using different exposure times by a camera aimed at a cross.
Figure 2B:
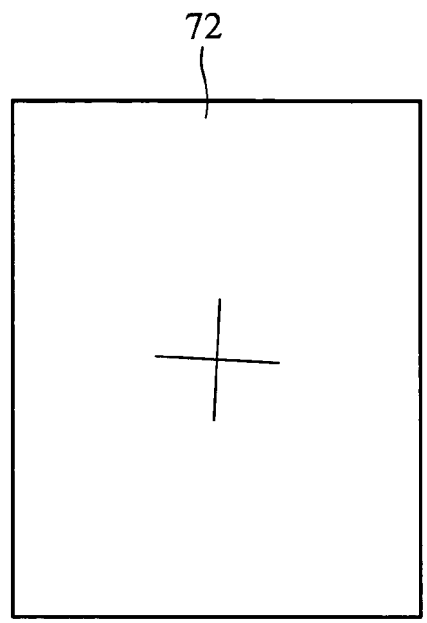
Figure 2C:
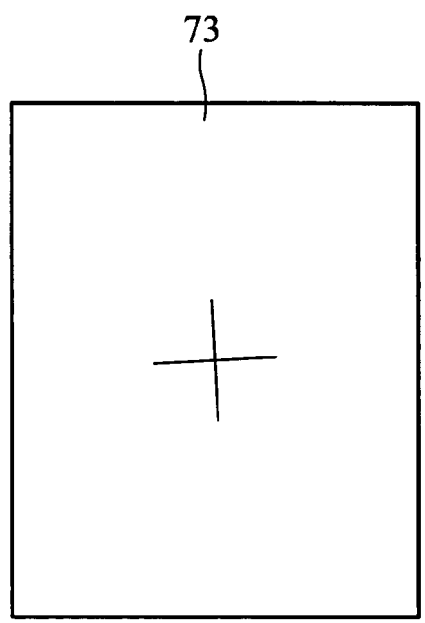
Figure 2D:
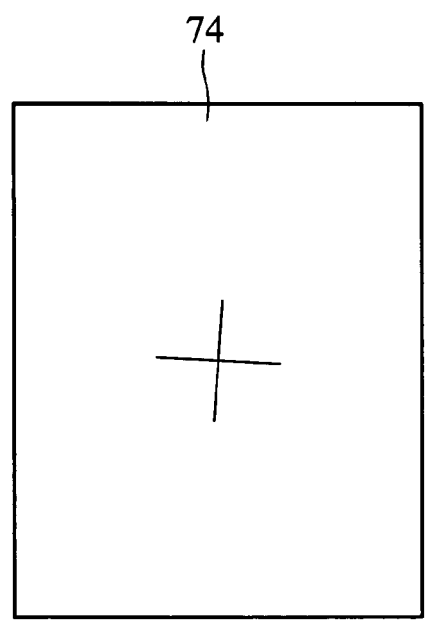

FIG. 1 shows a flowchart of a method for image cropping according to one embodiment of the invention.

In step 61, the transformation matrices derived by image registration are applied to the images.

Figure 3:
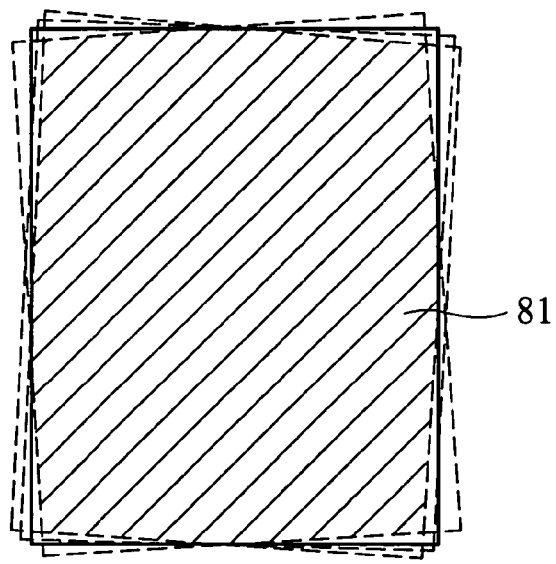
FIG. 3 shows the alignment of the four transformed results of the images in FIGS. 2A~2D.
Figure 4:
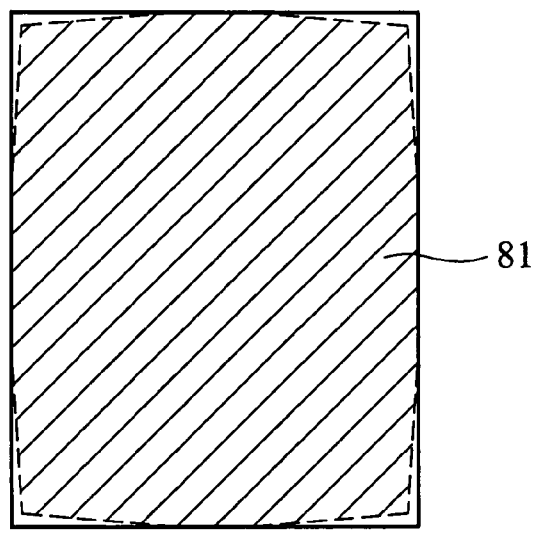
FIG. 4 shows a mask created to determine the cropping rectangle for the registration result of the images shown in FIGS. 2A~2D.

In step 62, a mask is created and has columns and rows with the same dimensions as the images. The mask distinguishes an overlapping region of all the transformed images. FIGS. 2A~2D respectively show four images 71~74 captured by a camera aimed at a cross using different exposure times, wherein the crosses in the images 72~74 are results of rotations of the cross in the image 71. FIG. 3 shows the alignment of the four transformed results of the images 71~74. It is noted that a region 81 is composed of a conjunction of the pixels of the four transformed images, i.e., the region 81 is an overlapping region of all the transformed images. FIG. 4 shows the corresponding mask, which has the same dimensions as each image, and the pixel in the mask has a value of zero if it is an element of the pixel conjunction (in the region 81); otherwise (outside the region 81), the pixel value is not zero.

In step 63, an edge list is created as shown in FIG. 6. The edge list is a one-dimensional array with a length the same as the height (number of the rows) of the mask and records the column indices of the left and right boundary pixels of each row of the region 81 in the mask.

In step 64, an optimal cropping function is applied to the edge list to derive two corners for determining the cropping rectangle.

First, as shown in FIG. 5A, in a sequence from top to bottom, for each row, a width between the left and right boundary pixel of the row and a height between the left boundary pixel and a bottom boundary pixel of the same column are calculated using the edge list. The product of the width and height is also derived. By comparing all the product, the largest is determined.

Second, as shown in FIG. 5B, in a sequence from bottom to top, for each row, a width between the left and right boundary pixel of the row and a height between the left boundary pixel and a top boundary pixel of the same column are calculated using the edge list. The product of the width and height is also derived. By comparing all the products, the largest is determined. Then, the two largest products derived in the two opposite row sequences for the left boundary pixels are compared to identify a corner of the cropping rectangle, wherein the left boundary pixel of the row having the larger one is the corner. If the corner is derived by the sequence from top to bottom, it is a top-left corner of the cropping rectangle; otherwise it is a bottom-left corner. Additionally, a semi-finished rectangle 82 is formed by this corner and the accompanied length and width which yield the largest product, as shown in FIGS. 5C and 5D, respectively when the corner is a bottom-left and top-left one.

Third, the edge list is updated with a region 81' shown in FIG. 5C or 5D. The region 81' is the overlapping region of the semi-finished rectangle 82 and the region 81. As shown in FIG. 5C, in a sequence from top to bottom, for each row, a width between the left and right boundary pixel of the row and a height between the right boundary pixel and a bottom boundary pixel of the same column are calculated using the edge list when the previously determined corner is a bottom-left one. The product of the width and height is also derived. By comparing all the products, the largest is determined. The right boundary pixel of the row having the largest product is the top-right corner of the cropping rectangle. Thus, the cropping rectangle is determined. Alternatively, as shown in FIG. 5D, in a sequence from bottom to top, for each row, a width between the left and right boundary pixel of the row and a height between the right boundary pixel and a top boundary pixel of the same column are calculated using the edge list when the previously determined corner is a top-left one. The product of the width and height is also derived. By comparing all the products, the largest is determined. The right boundary pixel of the row having the largest product is the bottom-right corner of the cropping rectangle. Thus, the cropping rectangle is determined.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for image cropping comprising the steps of:
   providing a plurality of images, wherein the images overlap with each other to generate an irregularly shaped region composed of columns and rows of pixels, wherein the pixels of the irregularly shaped region are elements of a pixel conjunction of transformed pixel sets of a plurality the images;
   automatically locating a cropping rectangle within the irregularly shaped region by automatically searching for a first corner and a second corner of the cropping rectangle, wherein the first corner and the second corner form the cropping rectangle, and the search method for the first corner and the second corner comprises the steps of:
   calculating, within the irregularly shaped region for each of the rows, a first width between a left and right boundary pixel of the row, a height between the left and a boundary pixel of the same column, another height between the left and the other boundary pixel of the same column, and first products of the widths and the heights;
   identifying one of the left boundary pixels in the irregularly shaped region as the first corner of the cropping rectangle, wherein the first product calculated for the row of the first corner is the largest, and a semi-finished rectangle region is formed by the first corner, and the length and width which yield the largest first product;
   calculating, within an overlapping region of the semi-finished rectangle region and the irregularly shaped region, for each of the rows, a width between a right and left boundary pixel of the row, a height between the right and a boundary pixel of the same column, another height between the right and the other boundary pixel of the same column, and second products of the widths and the heights;
   identifying one of the right boundary pixels in the overlapping region as the second corner of the cropping rectangle, wherein the second product calculated for the row of the second corner is the largest; and
   cropping the cropping rectangle with the first corner and the second corner from the images.

2. The method as claimed in claim 1, wherein the calculations of the first products are implemented for the rows in two sequences from top to bottom and from bottom to top.

3. The method as claimed in claim 1, wherein the calculations of the second products are implemented for the rows in a sequence from bottom to top.

4. The method as claimed in claim 1, wherein the calculations of the second products are implemented for the rows in a sequence from top to bottom.

5. The method as claimed in claim 1 further comprising creating a mask distinguishing the irregularly shaped region.

6. The method as claimed in claim 5, wherein column indices of the left and right boundary pixels are stored in a one-dimension edge list array having a length the same as a height of the mask.

* * * * *